US012573546B2

(12) United States Patent
Francis et al.

(10) Patent No.: US 12,573,546 B2
(45) Date of Patent: Mar. 10, 2026

(54) TRANSFORMER MODULE WITH UI CORE

(71) Applicant: Murata Manufacturing Co., Ltd., Nagaokakyo (JP)

(72) Inventors: Lee Francis, Milton Keynes (GB); Peter Cheung, Milton Keynes (GB)

(73) Assignee: Murata Manufacturing Co., Ltd., Kyoto (JP)

( * ) Notice: Subject to any disclaimer, the term of this patent is extended or adjusted under 35 U.S.C. 154(b) by 691 days.

(21) Appl. No.: 17/926,200

(22) PCT Filed: Jun. 10, 2021

(86) PCT No.: PCT/US2021/036734
§ 371 (c)(1),
(2) Date: Nov. 18, 2022

(87) PCT Pub. No.: WO2021/257359
PCT Pub. Date: Dec. 23, 2021

(65) Prior Publication Data

US 2023/0178296 A1 Jun. 8, 2023

Related U.S. Application Data

(60) Provisional application No. 63/041,296, filed on Jun. 19, 2020.

(51) Int. Cl.

| | |
|---|---|
| ***H01F 27/32*** | (2006.01) |
| ***H01F 27/02*** | (2006.01) |
| ***H01F 27/24*** | (2006.01) |
| ***H01F 27/29*** | (2006.01) |
| ***H01F 41/06*** | (2016.01) |

(52) U.S. Cl.
CPC ........... *H01F 27/327* (2013.01); *H01F 27/02* (2013.01); *H01F 27/24* (2013.01); *H01F 27/29* (2013.01); *H01F 27/325* (2013.01); *H01F 41/06* (2013.01)

(58) Field of Classification Search
CPC ........ H01F 38/10; H01F 27/306; H01F 30/06; H01F 27/266; H01F 30/04
See application file for complete search history.

(56) References Cited

U.S. PATENT DOCUMENTS

| | | | | |
|---|---|---|---|---|
| 6,335,671 | B1 | 1/2002 | Roessler et al. | |
| 10,910,139 | B1 * | 2/2021 | Folker | H01F 41/0206 |
| 2002/0057163 | A1 * | 5/2002 | McGrane | H01F 27/02 336/90 |

(Continued)

FOREIGN PATENT DOCUMENTS

| | | | |
|---|---|---|---|
| CN | 101231907 A | | 7/2008 |
| CN | 105849832 | * | 8/2016 |

(Continued)

OTHER PUBLICATIONS

Official Communication issued in International Patent Application No. PCT/US2021/036734, mailed on Sep. 30, 2021.

*Primary Examiner* — Kenneth Whittington
(74) *Attorney, Agent, or Firm* — Keating & Bennett, LLP

(57) ABSTRACT

A transformer assembly includes a substrate, a surface-mounted header on the substrate, a core on the surface-mounted header and including a U-shaped portion and I-shaped portion, and first and second bobbins on two legs of the U-shaped portion of the core.

22 Claims, 6 Drawing Sheets

(56) References Cited

U.S. PATENT DOCUMENTS

| | | | | |
|---|---|---|---|---|
| 2003/0038696 | A1* | 2/2003 | Chui | H01F 38/10 336/198 |
| 2006/0164197 | A1 | 7/2006 | Wu | |
| 2009/0184792 | A1* | 7/2009 | Yang | H01F 37/00 336/65 |
| 2013/0154782 | A1* | 6/2013 | Won | H01F 27/29 242/430 |
| 2014/0084790 | A1* | 3/2014 | Won | H02M 1/44 363/44 |
| 2018/0174742 | A1* | 6/2018 | Yang | H01F 27/06 |

FOREIGN PATENT DOCUMENTS

| | | | |
|---|---|---|---|
| JP | 2006-032659 | A | 2/2006 |
| JP | 2003-173918 | A | 6/2006 |
| JP | 2008-227019 | A | 9/2008 |
| JP | 2018-019027 | A | 2/2018 |
| KR | 20020093407 | * | 12/2002 |

* cited by examiner

TRANSFORMER MODULE WITH UI CORE

CROSS REFERENCE TO RELATED APPLICATIONS

This application claims the benefit of U.S. Provisional Patent Application No. 63/041,296 filed on Jun. 19, 2020. The entire contents of this application are hereby incorporated by reference.

BACKGROUND OF THE INVENTION

1. Field of the Invention

The present invention relates to transformers. More specifically, the present invention relates to an isolated transformer module assembly with a UI core.

2. Background

Existing transformer modules include a core which is isolated from the windings because the core is placed inside a core cup. The core cup is encapsulated prior to the windings being hand wound around the outside of the core cup and subsequently hand soldered to pads on a printed circuit board (PCB). The core cup provides necessary creepage distance between the core and the windings and between the primary winding and the secondary winding for safety as required by UL standards.

However, such designs are costly because of the need to encapsulate the core cup prior to adding the windings, hand winding the windings, and hand soldering the windings to pads on the PCB. Additionally, hand processing can introduce errors, weaknesses, or stress in the core windings, especially because hand solder joints of winding wires are prone to break during long term temperature cycling.

SUMMARY OF THE INVENTION

To overcome the problems described above, preferred embodiments of the present invention provide transformer modules each with one or more of the following features:

1) A core and winding structure that provides higher efficiency in assembly.
2) A machine wound bobbin that increases winding accuracy and reduces tolerances in electrical performance.
3) Modularity that allows for pick-and-place assembly on a substrate and then automated and/or in-line soldering.
4) The design of the transformer module offers a greater degree of automation with corresponding cost savings and performance enhancements.

According to a preferred embodiment of the present invention, a transformer assembly includes a substrate; a surface-mounted header on the substrate; a core on the surface-mounted header and including a U-shaped portion and I-shaped portion; and first and second bobbins on two legs of the U-shaped portion of the core.

The transformer assembly can further include a primary winding on the first bobbin and a secondary winding on the second bobbin, wherein the primary winding and the secondary winding can be machine wound around the first bobbin and the second bobbin, respectively, and the primary winding and the secondary winding can have a same number of turns.

The transformer assembly can further include a case, and the substrate, the surface-mounted header, the core, and the first and second bobbins can be in an interior of the case. The case can be at least partially filled with a dielectric material.

The surface-mounted header can include a vertical lead that includes a first leg and a first terminal. The first leg can be soldered to a pad on the substrate, and an end of either the primary winding or the secondary winding can be wound around the first terminal.

The surface-mounted header can include second legs, and the first leg and the second legs can be spaced with approximately a 1.27-mm pitch. The surface-mounted header can include second legs and second terminals, and a pitch of the first terminal and the second terminals is greater than a pitch of the first leg and the second legs.

The transformer assembly can further include input/output connections attached to the substrate and/or electrical circuitry components on the substrate.

According to a preferred embodiment of the present invention, a method of manufacturing a transformer assembly includes providing a substrate, surface mounting a header onto the substrate, providing a core including a U-shaped portion and an I-shaped portion, installing a first bobbin and a second bobbin on each of two legs of the U-shaped portion of the core, and installing the core onto the header.

The method can further include winding a primary winding on the first bobbin and winding a secondary winding on the second bobbin. The primary winding and the secondary winding can be machine wound around the first bobbin and the second bobbin, respectively. The primary winding and the secondary winding can have the same number of turns.

The method can further include providing a case and providing the substrate, the surface-mounted header, the core, and the first and second bobbins in an interior of the case. The method can further include at least partially filling the case with a dielectric material.

The header can include a vertical lead that includes a first leg and a first terminal. The method of can further include soldering the first leg to a pad on the substrate and winding an end of either the primary winding or the secondary winding around the first terminal. The header can include second legs, and the first leg and the second legs can spaced with approximately a 1.27-mm pitch. The surface-mounted header can include additional vertical leads that include second legs and second terminals, and a pitch of the first terminal and the second terminals can be greater than a pitch of the first leg and the second legs.

The method can further include attaching input/output connections to the substrate. The method can further include attaching electrical circuitry components on the substrate.

The above and other features, elements, steps, configurations, characteristics, and advantages of the present invention will become more apparent from the following detailed description of preferred embodiments of the present invention with reference to the attached drawings.

DETAILED DESCRIPTION OF PREFERRED EMBODIMENTS

Figure 1:
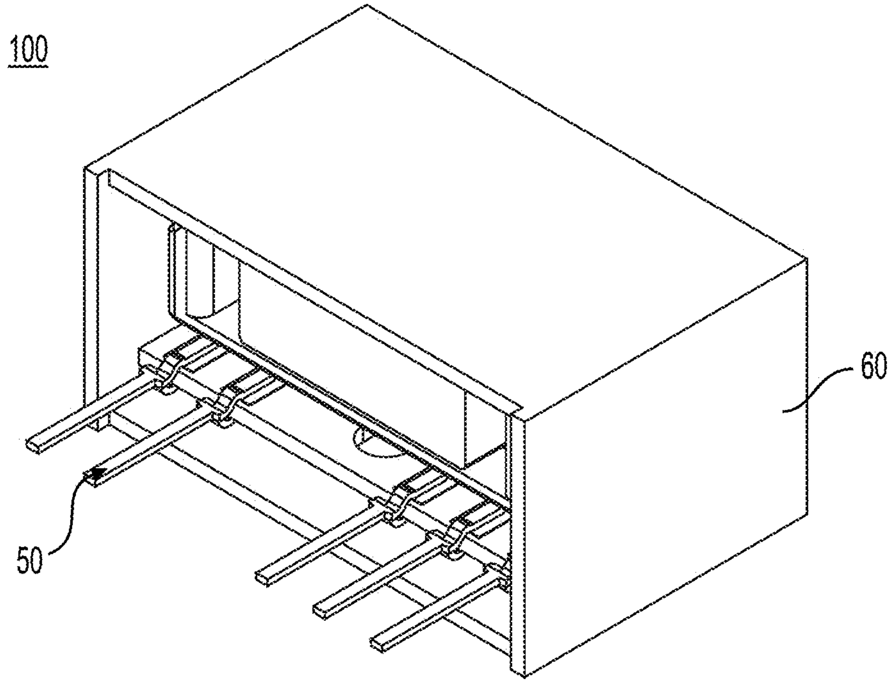
FIG. 1 shows an example of a transformer module with a case.

Preferred embodiments of the present invention provide an isolated transformer module that can be used in any suitable application. FIG. 1 shows a transformer module 100. FIG. 1 is an outer view of the transformer module 100 that shows the case 60 defining five outer surfaces of the transformer module 100 and the input/output (IO) pins 50 that protrude outside of the confines of the case 60. Although not shown, the case can be filled with a dielectric potting or encapsulation material to increase creepage and clearance distances, which increases safety and increases reliability. As shown in FIG. 1, some of the components of the transformer module 100 are hidden by the case 60.

Figure 2:
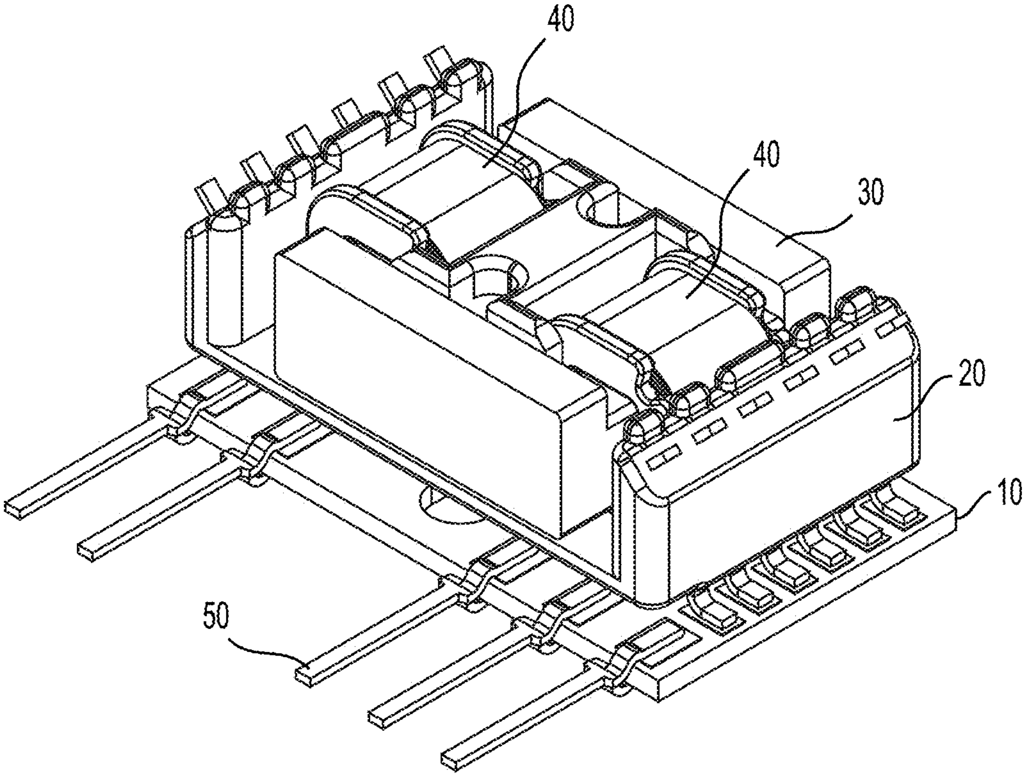
FIG. 2 shows the transformer module of FIG. 1 with the case removed.
Figure 3:
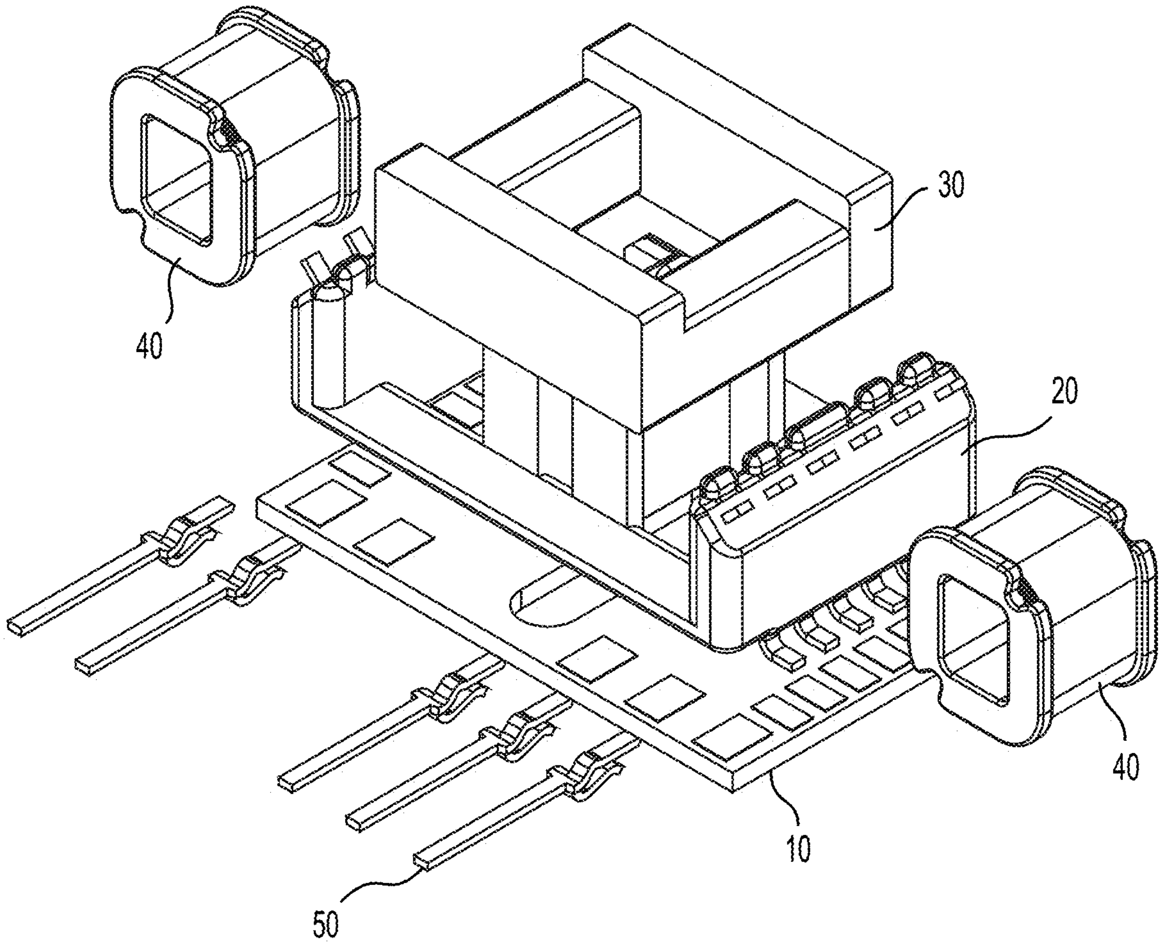
FIG. 3 shows an exploded view of the transformer module shown in FIG. 2.

FIG. 2 shows the transformer module 100 of FIG. 1 with the case 60 removed to show additional components. As shown in FIG. 2 without the case 60, the transformer module 100 can include a substrate 10, a header 20 mounted on the substrate 10, a core 30 provided on the header 20, bobbins 40 provided around legs of the core 30, and pins 50 mounted to the substrate 10. FIG. 3 is an exploded view of the transformer module of FIG. 2 that shows the substrate 10, the header 20, the core 30, the bobbins 40, and the pins 50.

Figure 4:
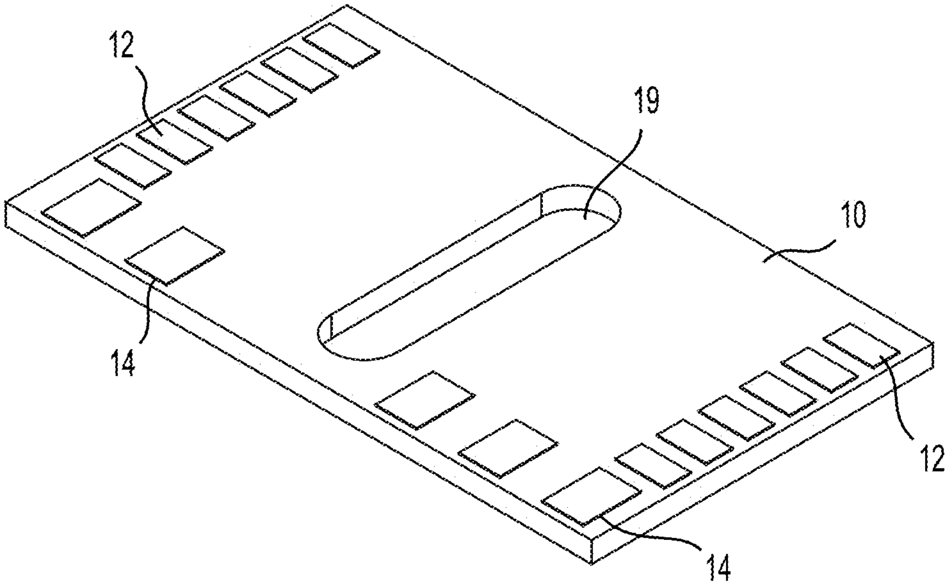
FIGS. 4 and 5 show views of the substrate.
Figure 5:
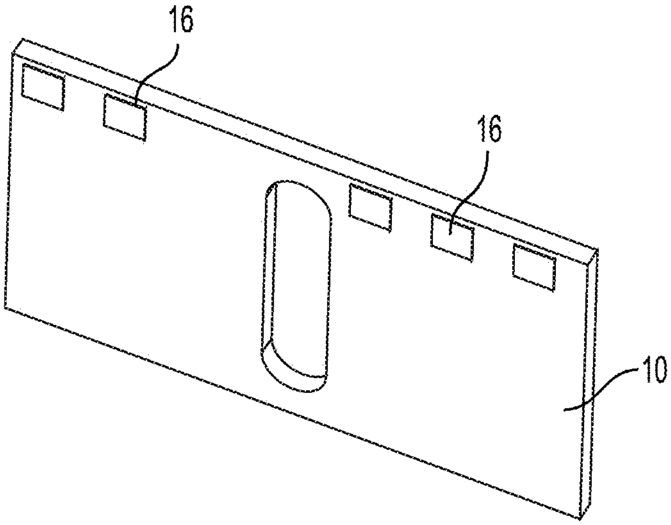

FIGS. 4 and 5 respectively show top and bottom views of the substrate 10. Although other shapes are possible, as shown in FIGS. 4 and 5, the substrate 10 can have a rectangular or substantially rectangular shaped and includes a slot or opening 19 through the substrate 19 in a middle portion of the substrate 10. The opening 19 can be used to reduce weight of the transformer module 100, and the opening 19 can also allow interior potting or encapsulating material to flow through to both sides of the substrate 10.

The substrate 10 can be multilayer and can be single-sided, or double-sided to route electrical traces around the substrate 10. The substrate 10 can be, for example, a PCB fabricated of FR-4, or G-10, or monolithic silicon, ceramic, or any other suitable material. Although not shown, the substrate 10 can include other circuit components in addition to a transformer. The substrate 10 can be used to route electrical connections between the header 20, IO pads 14 and 16 (described below), and any other circuit components. FIG. 4 shows that a top surface of the substrate 10 can include two rows of header pads 12 respectively extending along the left and right edges of the substrate 10. The two rows of header pads 12 can be mirror images of, or symmetrical to, each other. The header pads 12 can be used to mount the header 20 as shown in FIG. 2. Although two rows of six header pads 12 each are shown, other numbers and configurations of header pads 12 are possible. The header pads 12 can be spaced at a pitch of about 1.27 mm, for example, or at another suitable spacing.

FIG. 4 also shows a first row of IO pads 14 extending across a front edge of the substrate 10 and used to mount the IO pins 50. FIG. 5 shows a second row of IO pads 16 on the bottom surface of the substrate 10 that are located at positions corresponding to the first row of IO pads 14. Although five IO pads 14 and 16 are shown in FIGS. 4 and 5, other numbers of IO pads can be provided. If a different style of IO pins 50 is used, the structures and/or locations of the IO pads 14 and 16 can be modified to accommodate different pin styles and the like. For example, only a single row of IO pads 14 or 16 can be provided, or conductive through holes can be used, instead of the IO pads 14 and/or 16.

Figure 6:
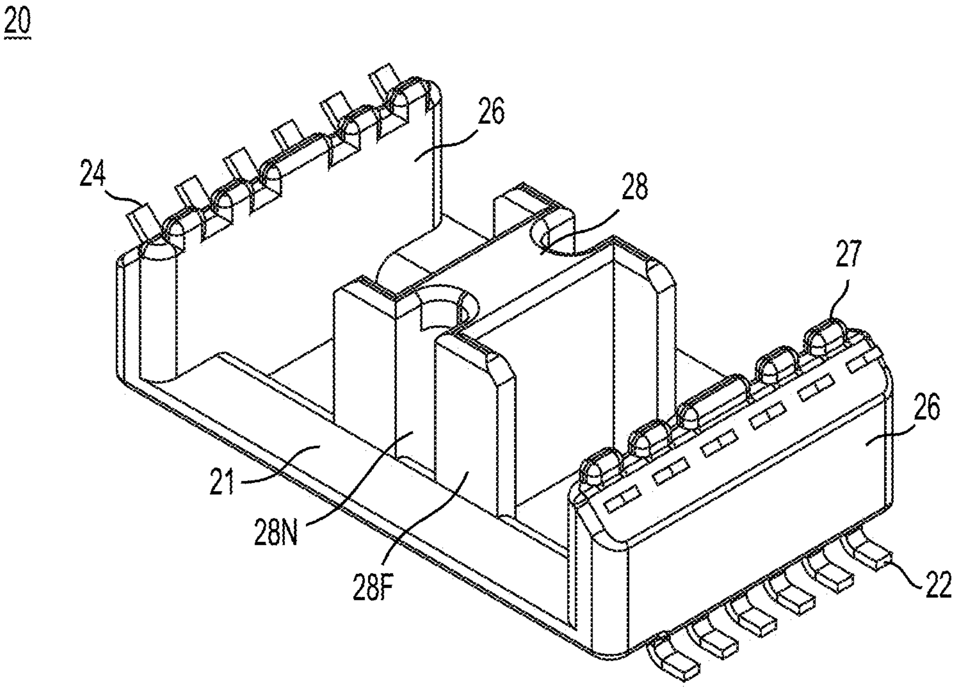
FIGS. 6 and 7 show views of the header.
Figure 7:
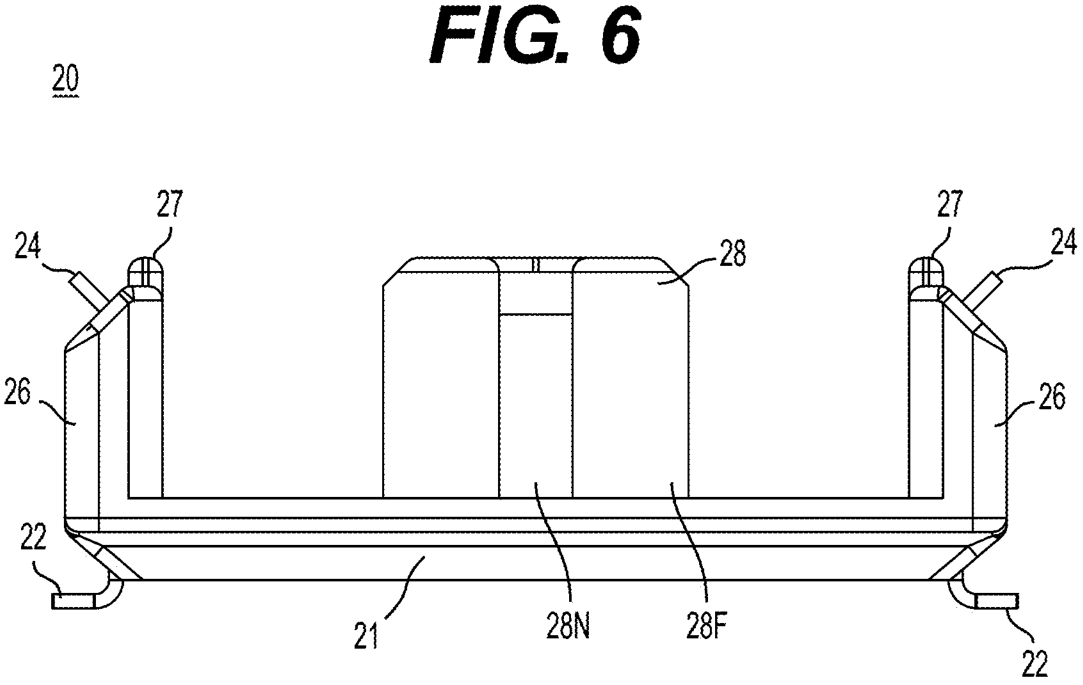

FIG. 6 is a perspective view of the header 20, and FIG. 7 is a front view of the header 20. FIGS. 6 and 7 shows that the header 20 can be symmetrically U-shaped and can include a base 21, two opposing side walls 26 at edges of the base 21, and a header protrusion 28. The header protrusion 28 can be included to orient the core 30 and the bobbins 40. The header protrusion 28 can include two notches 28N at opposing ends of the header protrusion 28 and two flanges 28F at each of the opposing ends of the header protrusion 28, for a total of four flanges 28F, for example. The two notches 28N can provide a pathway to facilitate the flow of potting or encapsulating material to reach the interior spaces of the core 30 and bobbins 40. The four flanges 28F of the header protrusion 28 can be used to orient the core 30 and bobbins 40. However, other arrangements are possible. For example, the four flanges 28F can be eliminated, and the base of header 20 can orient the core 30 and the bobbins 40.

The side walls 26 can overmold a lead frame including vertical or substantially vertical leads. Although most portions of the vertical leads are hidden by the overmolded side walls 26, the vertical leads can include J-shaped feet 22 that exit along the bottom and corresponding straight angled terminals 24 that exit at the top of the side walls. The feet 22 can be used to surface mount the header 20 to the substrate 10. The terminals 24 are used to connect ends of the winding wire to the header pads 12 on substrate 10. An automated pick-and-place process can be used to align the header 20 to the substrate 10 during assembly and the feet 22 can be surface mounted to the header pads 12 on the substrate 10 by soldering. It is also possible to connect the header 20 to the substrate by any suitable method, including, for example, bonding, welding, conductive adhesive, or any other suitable method including a bulk in-line soldering process.

The terminals 24 connect to the ends of the wiring that is used for windings in the bobbins 40. The pitch of the terminals 24 can be wider than the pitch of the feet 22 to provide more room between terminals 24 than is between the feet 22. Accordingly, a space for terminating the windings to the terminals 24 by hand can be significantly increased. A series of protrusions or columns 27 can be included at the top of the side walls 26 to define openings or notches between adjacent columns 27. Once the core 30 and the bobbins 40 are placed, wiring used for the windings can be routed through locations between the columns 27 and adjacent wires can be physically separated. Subsequently, the ends of each wiring are each attached to a corresponding terminal 24. The ends of the wiring used for windings can be wrapped by hand around the corresponding terminal 24 and then left in place, subsequently soldered by hand, soldered using a bulk in-line method, or welded by machine.

Figure 8:
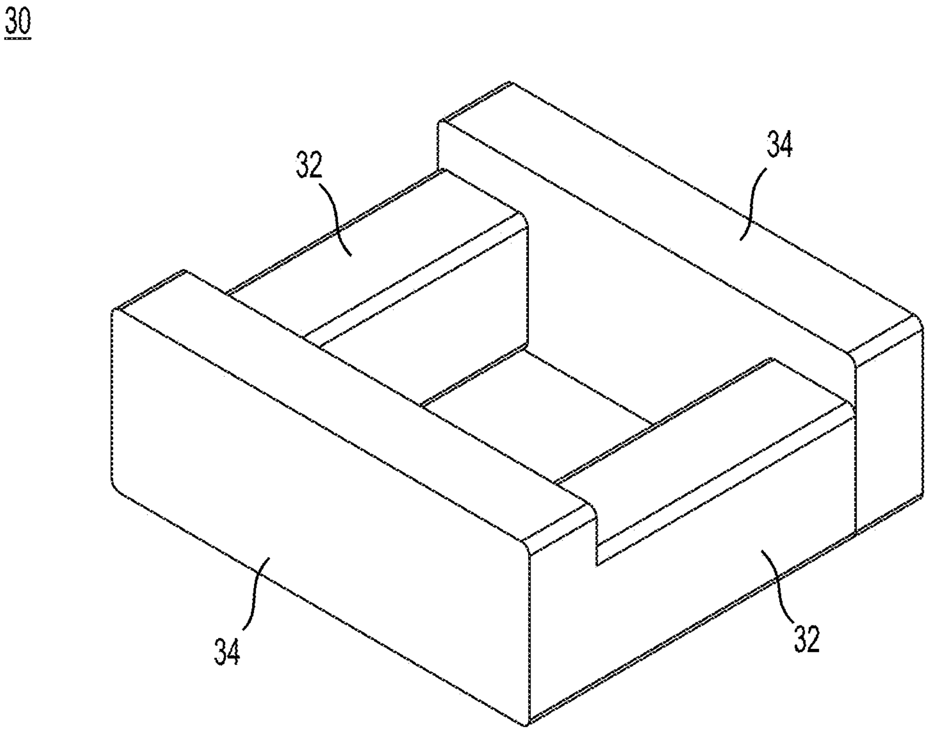
FIG. 8 shows a view of the core.

FIG. 8 is a perspective view of the magnetic core 30. The core 30 can be an UI core with a U-portion with two legs 32 and a cross-member 34 connected to an I-portion with a cross-member 34. The core 30 can be symmetrically frame-shaped and include two legs 32 connecting two cross-members 34. Although not shown, the core 30 can be two or more pieces to facilitate placement of the bobbins 40 on each leg 32. For example, a UI core can include two separate pieces that can be joined together: the U-portion and the I-portion. The center of the core 30 can include an opening, and the core 30 with bobbins 40 can fit onto the header 20. In particular, the header protrusion 28 in the center of the header 20 can fit through the opening of the core 30 to orient the core 30 and bobbins 40 to the header 20. The core 30 can be adhered to the header 20 to maintain proper orientation and to significantly reduce or prevent relative movement between the core 30 and the header 20. Alternatively, the core 30 can be held in place to the header by a mechanical structure, for example, a clip, latch, retainer, or the like. Alternatively, the core 30 can include a dielectric covering or can be encapsulated with a dielectric to increase effective creepage and clearance distances.

Figure 9:
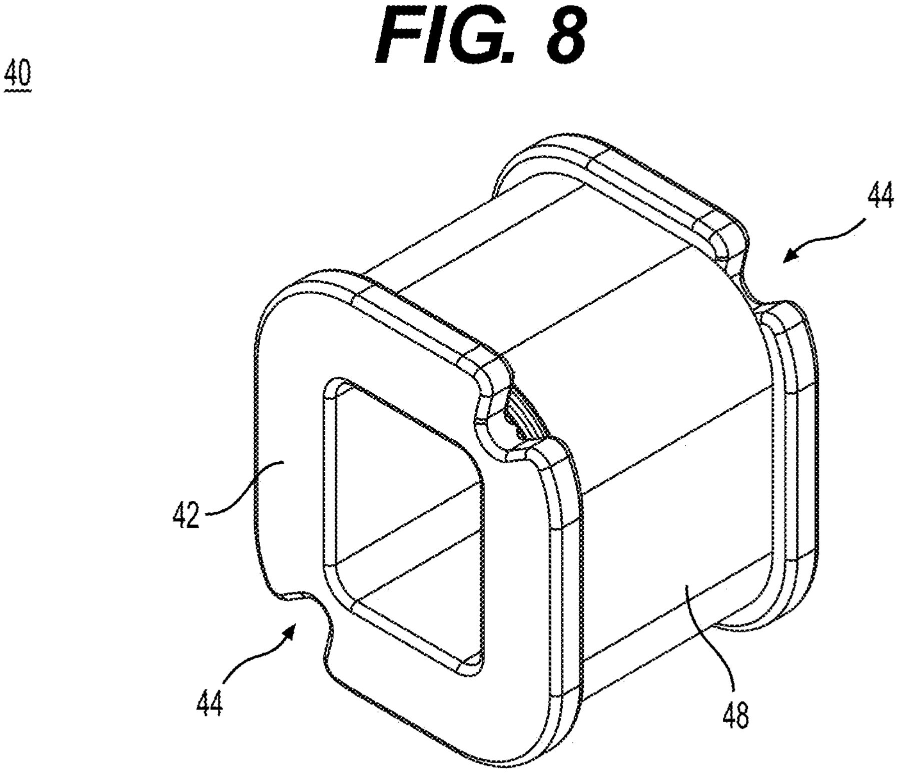
FIG. 9 shows a view of a bobbin.

FIG. 9 is a perspective view of a bobbin 40. The bobbin 40 is made of a dielectric material, for example, a plastic, and has a shape similar to a spindle or reel. Accordingly, wires can be wound around the bobbin 40 to define transformer windings, and legs 32 of the core 30 can pass through the center of the bobbin 40. Each of the bobbins 40 in the transformer module 100 can have windings with the same or different number of turns and can define the primary and secondary windings of the transformer. As shown in FIG. 9, the bobbin 40 can include two flanges 42, one at each end of a center tubular structure, and the flanges 42 can keep the wires of the winding around the bobbin from falling off ends of the center tubular structure. The windings on the bobbins 40 can be wound by machine, which is more compact, accurate, and precise than winding by hand and can also provide a greater number of turns than can be obtained by hand winding. FIG. 9 shows that each of the flanges 42 can include a notch 44 that orients and separates ends of wire that is used for the winding. Once wound, the wires for the winding can be held in place using, for example, a dielectric tape 48, adhesive, or by using any suitable material or method.

Figure 10:
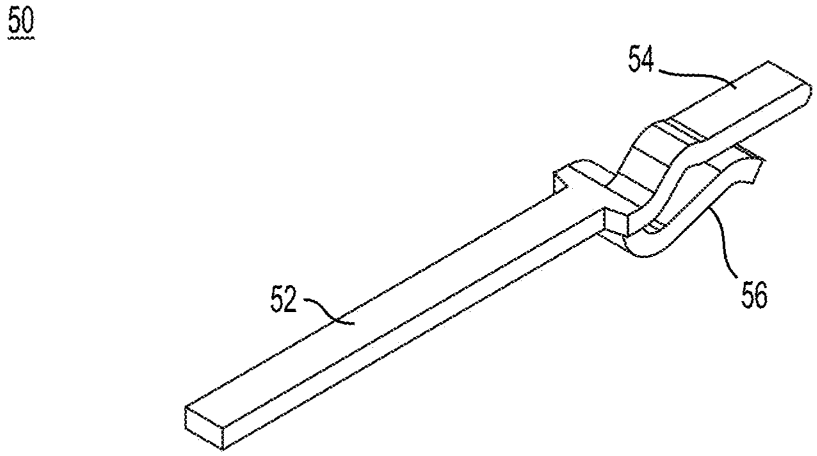
FIG. 10 shows a view of a pin.

FIG. 10 is a perspective view of an IO pin 50. As shown in FIG. 2, several IO pins 50 are attached to the substrate 10 and are used as electrical connection points for the transformer module 100. Although many different styles of pins are possible, FIG. 10 shows that the IO pin 50 includes a longer straight portion 52 extending from two opposing tabs 54 and 56. FIG. 2 shows that the tabs 54 and 56 are oriented over the front edge of the substrate 10, and each of the tabs 54 and 56 are aligned over respective ones of the top and bottom IO pads 14 and 16. The opposing tabs 54 and 56 can be spring loaded with a spacing between that opposing tabs 54 and 56 that matches or substantially matches the thickness of the substrate 10 so that the IO pin 50 is able to be held in place before the IO pin 50 is permanently attached to the corresponding top and bottom IO pads 14 and 16. The IO pin 50 can be permanently attached to the corresponding top and bottom IO pads 14 and 16 by, for example, soldering, bonding, welding, using conductive adhesive, or any other suitable method. As shown in FIG. 1, the straight portion 52 exits a side of the transformer module 100 that is not blocked by the case 60. The straight portion 52 can connect the transformer module 100 to other circuit elements or the like, for example, a host substrate. The IO pin 50 can be made of, for example, beryllium copper, copper, gold, or any other suitable conductive material.

Figure 11:
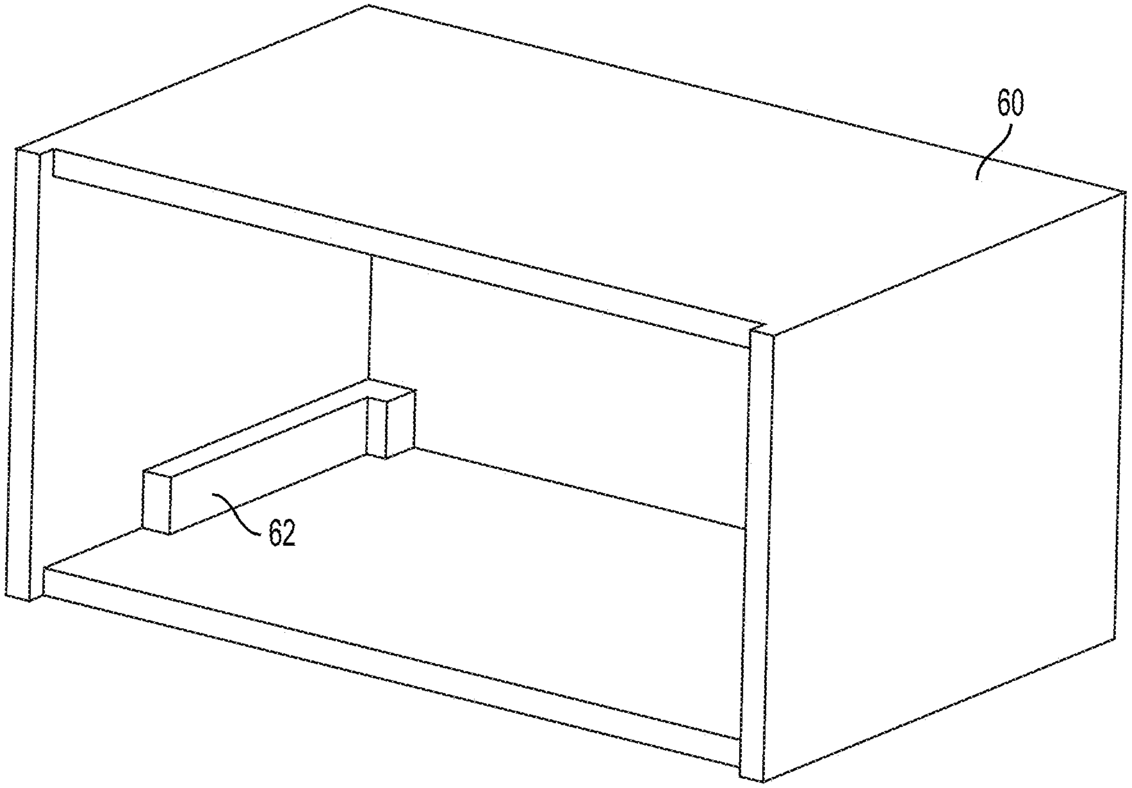
FIG. 11 shows a view of the case.

FIG. 11 is a perspective view of the case 60. The case 60 can be substantially cubic- or box-shaped with one side open. The case 60 can also include a retaining feature 62 that orients and spaces the transformer mounted substrate (see FIG. 2) in the case 60. The case 60 can be made of a dielectric material, for example, plastic or any other suitable material. Alternatively, the case 60 can be provided with a lid that closes the open side of the case 60 but allows the IO pins 50 to protrude through the lid. Alternatively, the case 60 can be filled with a dielectric potting or encapsulating material to surround the transformer assembly to increase isolation between electrical features and to reduce susceptibility to damage from shock, vibration, and moisture. Alternatively, the electrical components of the transformer module assembly can be overmolded, potted, or encapsulated without including the case 60.

Preferred embodiments of the present invention include features that provide a transformer module assembly to be made with increased automation and higher performance at less cost than current designs.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A transformer assembly comprising:
a substrate;
a surface-mounted header on the substrate and including a vertical lead;
a core on the surface-mounted header;
first and second bobbins on two legs of the core;
a winding wound around the first or the second bobbin and including an end wound around the vertical lead; and
a case, wherein
the substrate, the surface-mounted header, the core, and the first and second bobbins are in an interior of the case.

2. The transformer assembly of claim 1, wherein
the winding includes a primary winding and secondary winding,
the primary winding is wound on the first bobbin, and
the secondary winding is wound on the second bobbin.

3. The transformer assembly of claim 2, wherein the primary winding and the secondary winding are machine wound around the first bobbin and the second bobbin, respectively.

4. The transformer assembly of claim 2, wherein the primary winding and the secondary winding have a same number of turns.

5. The transformer assembly of claim 1, further comprising electrical circuitry components on the substrate.

6. The transformer assembly of claim 1, wherein the case is at least partially filled with a dielectric material.

7. The transformer assembly of claim 2, wherein the vertical lead includes a first leg and a first terminal.

8. The transformer assembly of claim 7, wherein
the first leg is soldered to a pad on the substrate; and
the end of the winding wound around the vertical lead is an end of either the primary winding or the secondary winding and is wound around the first terminal.

9. The transformer assembly of claim 7, wherein the surface-mounted header includes second legs, and the first leg and the second legs are spaced with approximately a 1.27-mm pitch.

10. The transformer assembly of claim 7, wherein
the surface-mounted header includes additional vertical leads that include second legs and second terminals; and
a pitch of the first terminal and the second terminals is greater than a pitch of the first leg and the second legs.

11. The transformer assembly of claim 1, further comprising input/output connections attached to the substrate.

12. A method of manufacturing a transformer assembly, the method comprising:
providing a substrate;

surface mounting a header onto the substrate, the header including a vertical lead;

providing a core;

installing a first bobbin and a second bobbin on each of two legs of the core;

winding a winding around the first or the second bobbin;

installing the core onto the header;

winding an end of the winding around the vertical lead;

providing a case; and providing the substrate, the surface-mounted header, the core, and the first and second bobbins in an interior of the case.

13. The method of claim 12, further comprising attaching input/output connections to the substrate.

14. The method of claim 12, wherein the winding includes a primary winding and secondary winding; and winding the winding around the first or the second bobbin includes:

winding the primary winding on the first bobbin; and winding the secondary winding on the second bobbin.

15. The method of claim 14, wherein the primary winding and the secondary winding are machine wound around the first bobbin and the second bobbin, respectively.

16. The method of claim 14, wherein the primary winding and the secondary winding have a same number of turns.

17. The method of claim 12, further comprising attaching electrical circuitry components on the substrate.

18. The method of claim 12, further comprising at least partially filling the case with a dielectric material.

19. The method of claim 12, wherein the vertical lead includes a first leg and a first terminal.

20. The method of claim 19, further comprising soldering the first leg to a pad on the substrate, wherein the end of the winding wound around the vertical lead is an end of either the primary winding or the secondary winding and is wound around the first terminal.

21. The method of claim 19, wherein the header includes second legs, and the first leg and the second legs are spaced with approximately a 1.27-mm pitch.

22. The method of claim 19, wherein the surface-mounted header includes additional vertical leads that include second legs and second terminals, and a pitch of the first terminal and the second terminals is greater than a pitch of the first leg and the second legs.

* * * * *